US005892889A

United States Patent [19]

Nishijima

[11] Patent Number: 5,892,889

[45] Date of Patent: Apr. 6, 1999

[54] PRINTER AND INTERNAL CONDITION OUTPUT METHOD

[75] Inventor: Takanori Nishijima, Tokyo, Japan

[73] Assignee: Canon Kabushiki Kaisha, Tokyo, Japan

[21] Appl. No.: 14,246

[22] Filed: Feb. 5, 1993

[30] Foreign Application Priority Data

Feb. 6, 1992 [JP] Japan .................................... 4-020922

[51] Int. Cl.[6] ...................................................... G06F 15/00

[52] U.S. Cl. ............................................................ 395/101

[58] Field of Search .................................... 395/101, 112, 395/114, 117, 113, 200.3, 200.31, 200.46, 200.47, 200.51, 200.52, 200.54, 200.55, 200.76; 358/453, 464, 467; 400/75, 76; 345/339, 133, 146; 399/139, 144

[56] References Cited

U.S. PATENT DOCUMENTS

| | | | |
|---|---|---|---|
| 4,316,188 | 2/1982 | Cancasci, Jr. | 345/195 |
| 4,348,739 | 9/1982 | Deaver et al. | 364/900 |
| 4,841,280 | 6/1989 | Hermann et al. | 340/706 |
| 4,926,347 | 5/1990 | Uchida et al. | 364/519 |
| 4,968,159 | 11/1990 | Sasaki et al. | 400/76 |
| 5,083,262 | 1/1992 | Haft, Jr. | 395/500 |
| 5,109,275 | 4/1992 | Naua et al. | 358/80 |
| 5,150,455 | 9/1992 | Moriuawa et al. | 395/114 |
| 5,706,411 | 1/1998 | McCormick et al. | 395/113 |

FOREIGN PATENT DOCUMENTS

| | | |
|---|---|---|
| 60-167044 | 8/1985 | Japan . |
| 02034376 | 2/1990 | Japan . |

OTHER PUBLICATIONS

"Data Processor Diagnostic Test System", *IBM Technical Disclosure Bulletin*, vol. 21, No. 1, pp. 115–117, Jun. 1978.

J.R. Booth, "Display Used for Typewriter Indicators", *IBM Technical Disclosure Bulletin*, vol. 24, No. 1B, pp. 580–581, Jun. 1981.

R. Dominguez, Jr., et al., "Error Detection During Character Generator Operation", *IBM Technical Disclosure Bulletin*, vol. 26, No. 4, p. 1907, Sep. 1983.

*Primary Examiner*—David K. Moore
*Assistant Examiner*—Gabriel I. Garcia
*Attorney, Agent, or Firm*—Fitzpatrick, Cella, Harper & Scinto

[57] ABSTRACT

A printer includes a discriminating section for discriminating meaningless and meaningful internal parameters in a current internal condition, and an output section for outputting the meaningful and meaningless internal parameters while clarifying a difference therebetween on the basis of a discrimination result obtained by the discriminating section. An internal condition output method is also disclosed.

16 Claims, 11 Drawing Sheets

PRINTER AND INTERNAL CONDITION OUTPUT METHOD

BACKGROUND OF THE INVENTION

1. Field of the Invention

The present invention relates to a printer having a function of outputting the internal condition of the printer, and a method of outputting the internal condition of the printer.

2. Related Background Art

Some conventional printers can change their internal conditions in accordance with print information transmitted from an external unit (host computer). In addition, a change in internal condition of such a printer can be made by operating a button switch or the like on an operation panel arranged on the printer. In a printer of this type, the internal condition can be output. For example, the internal condition is printed on a recording medium or displayed on a liquid crystal display.

Some printers have nonvolatile memories for storing the internal conditions. In such a printer, when the internal condition is to be output, if the internal condition stored in the memory is different from print information from a host computer or the internal condition changed by an operation of a button switch on the operation panel, the internal condition is output while character attributes are changed to inform that the printer is set in a condition different from the initial setting. In the above printer, a code string representing the internal condition is stored in advance so that when the internal condition is to be output, code strings corresponding to the set conditions of the respective internal parameters are output. If, for example, this output means is to print the data on a recording medium, the code strings are printed by a predetermined printer. The print space for such data is generally determined by ruled line information and the like for expressing internal parameters and set conditions in the form of a table.

Not all of the internal parameters of a printer are independent, but some of them are dependent on other internal parameters. That is, depending on the set condition of a given internal parameter, a meaningless internal parameter, which has no influence on the operation state regardless of a change in the set condition, and a meaningful internal parameter, which causes a change in operation state when the set condition is changed, are present. Assume that in an internal parameter of "communication interface", "parallel communication" is set. In this case, an internal parameter of "baud-rate" for setting an information rate in serial communication is an unnecessary condition in the execution of "parallel communication" and hence is a meaningless internal parameter.

In the above-described conventional printer, however, meaningful internal parameters as well as meaningless internal parameters in the current set conditions are printed in a uniform print environment. For this reason, in the current internal condition of the printer, the meaningful and meaningless internal parameters cannot be discriminated. Therefore, a user cannot know which internal parameters he/she should operate.

In addition, in the conventional printer described above, the output internal condition includes no information associated with a method of setting each internal parameter, e.g., "set with a panel" or "set from a host computer". For example, therefore, when the user is to change internal parameters of the printer upon checking the current internal condition, he/she must perform cumbersome operations, e.g., referring to an operation manual to know a method of setting each internal parameter.

Furthermore, as in the conventional printer described above, when the internal condition is to be printed by using a predetermined code string, if the code string corresponding to the description of the internal condition is too long, it may overflow the print space predetermined by ruled line information and the like. In this case, in the conventional printer, the code string is processed by the following two methods: a method of continuing a print operation regardless of the condition described above, and a method of interrupting a print operation of the code string representing the set condition. For this reason, in the former method, since the description of the internal condition and the print information such as ruled line information are promiscuously printed together, disordered print results are produced. In the latter method, since the entire code string representing the internal condition is not printed, and the user cannot judge that the entire code string is printed, the user may misunderstand the internal condition of the printer.

SUMMARY OF THE INVENTION

It is an object of the present invention to provide a printer and an internal condition output method, which can achieve an improvement in operability by outputting information about the internal condition of the printer while clarifying predetermined information.

In outputting information about the internal condition of the printer, since meaningless and meaningful parameters in the current internal condition can be output while the difference therebetween is clarified, a user can easily know, on the basis of the output results of the internal condition, which parameters he/she should operate to change the internal condition of the printer, thereby improving the operability of the printer.

In addition, in outputting the internal condition of the printer, the output results of the internal condition can be changed on the basis of information associated with operating methods of changing the set contents of the respective internal parameters of the printer. Therefore, when the internal condition of the printer is to be changed, the user can easily know which operations he/she should operate to change the set contents of desired internal parameters, thus improving the operability of the printer.

Furthermore, in outputting the internal condition of the printer, printing can be performed while the omission of part of the description of a set content is clarified on the printed result. Therefore, the user can easily determine that part of the obtained output is omitted. This prevents the user from misunderstanding the internal condition of the printer. In addition, disordered mixture of the set contents of internal parameters and other print information, i.e., disordered print results, can be prevented.

BRIEF DESCRIPTION OF THE DRAWINGS

FIGS. 12-1 and 12-2 are views showing printed samples of internal parameters in the first embodiment;

FIGS. 14-1 and 14-2 are views showing printed samples of internal parameters printed with different fonts.

DETAILED DESCRIPTION OF THE PREFERRED EMBODIMENTS

Preferred embodiments of the present invention will be described below with reference to the accompanying drawings.

First Embodiment

Figure 1:
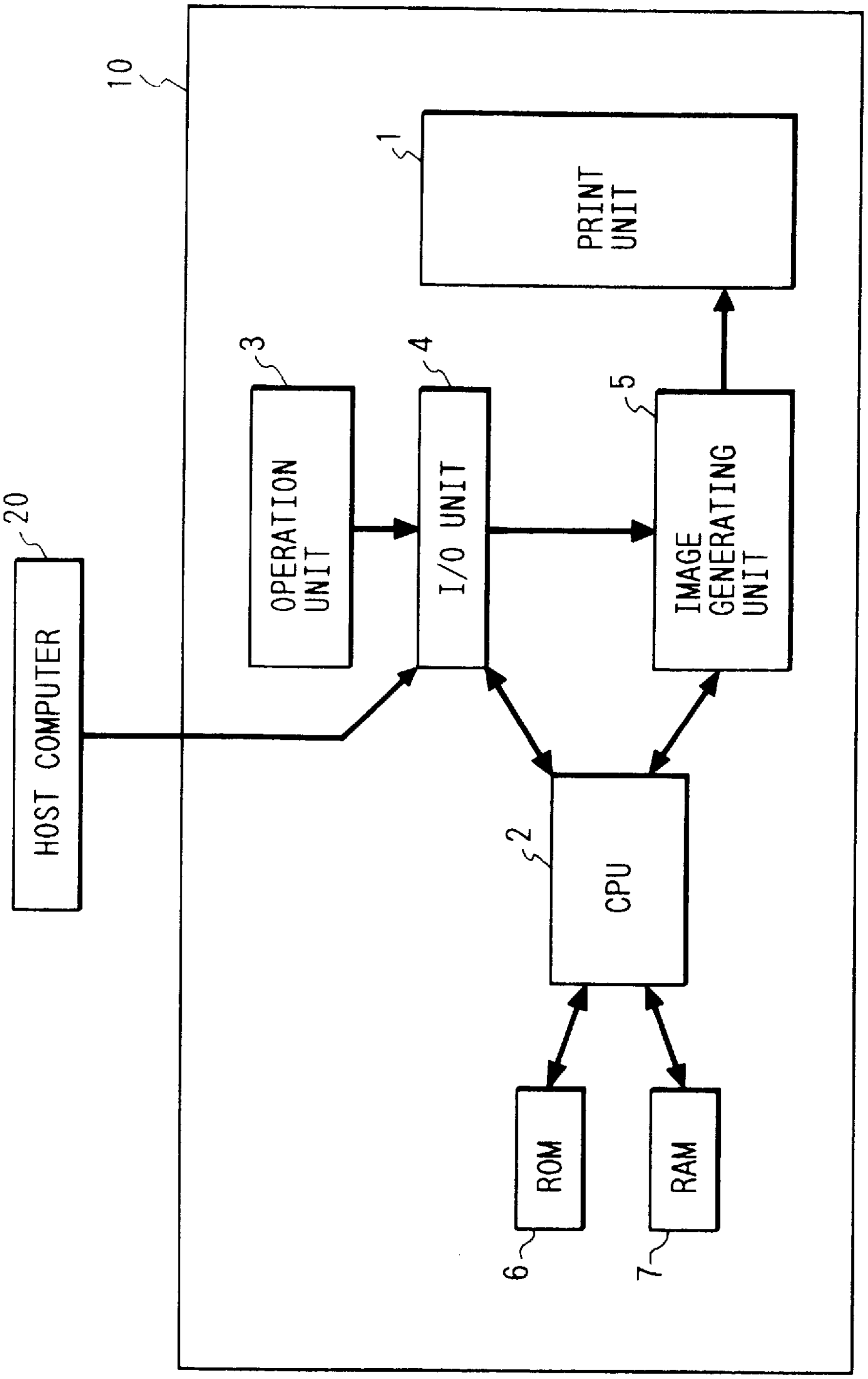
FIG. 1 is a block diagram showing the arrangement of a printer according to the first embodiment of the present invention.

FIG. 1 is a block diagram showing the arrangement of a printer according to the first embodiment. A printer 10 has a means for printing the internal condition. The printer 10 includes a print unit 1 for decoding print information and printing resultant information by a known technique. The print unit 1 may employ any one of an electrophotographic scheme, a thermal scheme, an ink jet scheme, and the like. A CPU 2 serving as a control unit executes various types of control operations of the printer 10. An operation unit 3 receives an instruction to change the internal condition, an instruction to print the internal condition, and the like. An I/O unit 4 receives print information from a host computer 20 and signals from the operation unit 3. An image generating unit 5 generates an image to be printed on the basis of print information. The I/O unit 4 and the image generating unit 5 are controlled by the CPU 2. A ROM (read-only memory) 6 serves to store various programs to be processed by the CPU 2, and the like, e.g., programs for decoding/printing external print information, and fonts used to print characters. A RAM (random access memory) 7 stores the internal condition of the printer 10 and serves as a temporal storage for the CPU 2.

In the printer 10 having the above-described arrangement, the programs stored in the ROM 6 and indicated by the flow charts to be described later are executed under the control of the CPU 2 so that when the internal condition is to be printed, it is determined whether each internal parameter is meaningful (a meaningful parameter) in the current set condition. The parameters which are meaningless (meaningless parameters) in the current set conditions are printed upon changing the print environment, thus printing the meaningless and meaningful parameters while clarifying the difference therebetween.

Figure 2:
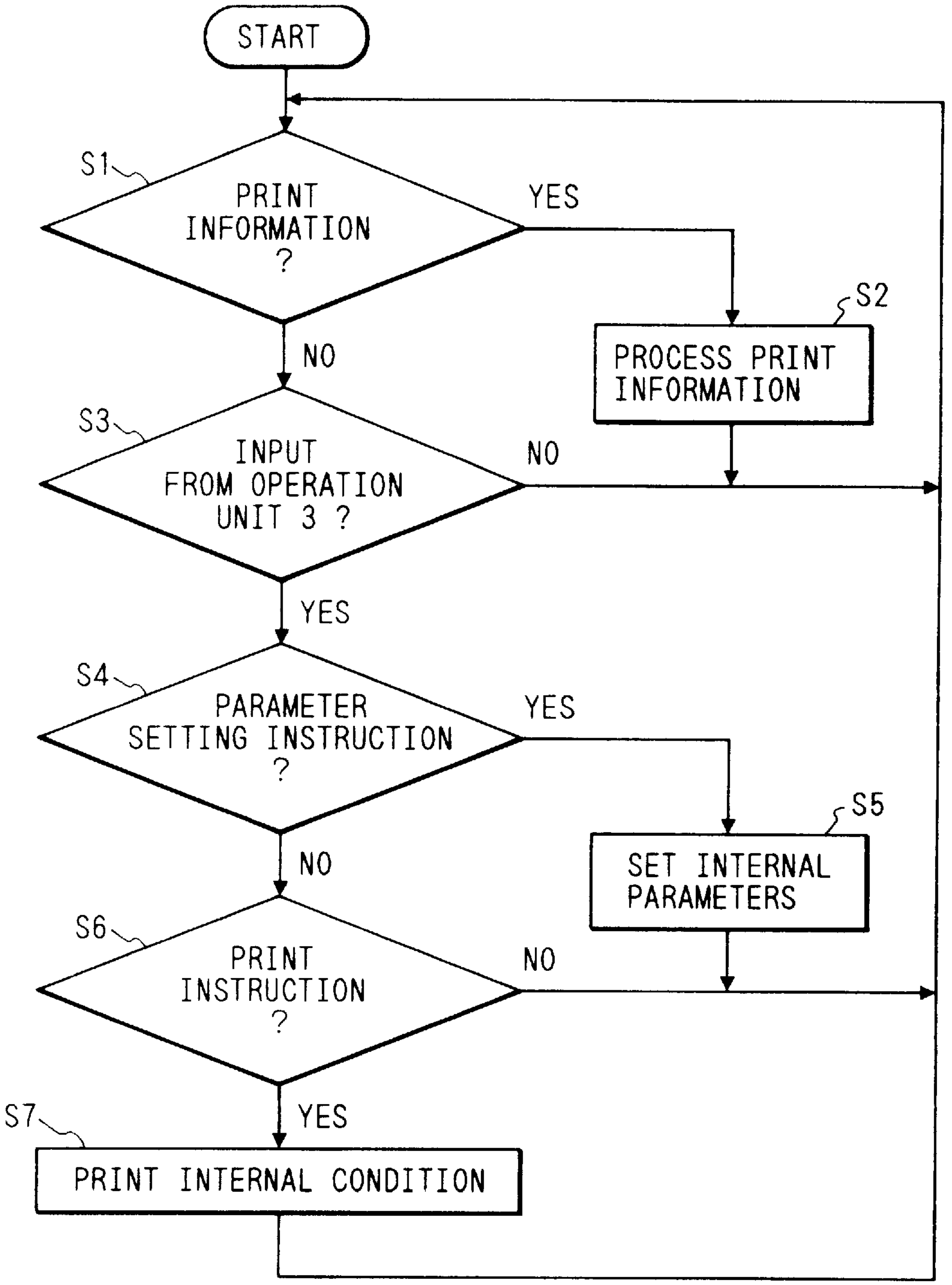
FIG. 2 is a flow chart showing a sequence employed by the printer according to the first embodiment.

FIG. 2 is a flow chart showing a sequence employed by the printer of the first embodiment. The CPU 2 loops through steps S1 to S3 while waiting for an operation input from the operation unit 3. If it is determined in step S1 that print information is received from the host computer 20, the flow advances to step S2 to decode the received print information and print the resultant information. This print information includes internal set information. If this information is processed in step S2, the internal condition of the printer 10 is changed.

If it is determined in step S3 that an input from the operation unit 3 is received, the flow advances to step S4. If it is determined in step S4 that the input from the operation unit 3 is an internal parameter setting instruction, the flow advances to step S5 to execute a setting or changing operation of the internal condition of the printer 10. If it is determined in step S6 that the input from the operation unit 3 is internal parameter print instruction, the flow advances to step S7 to print the internal condition.

Figure 3:
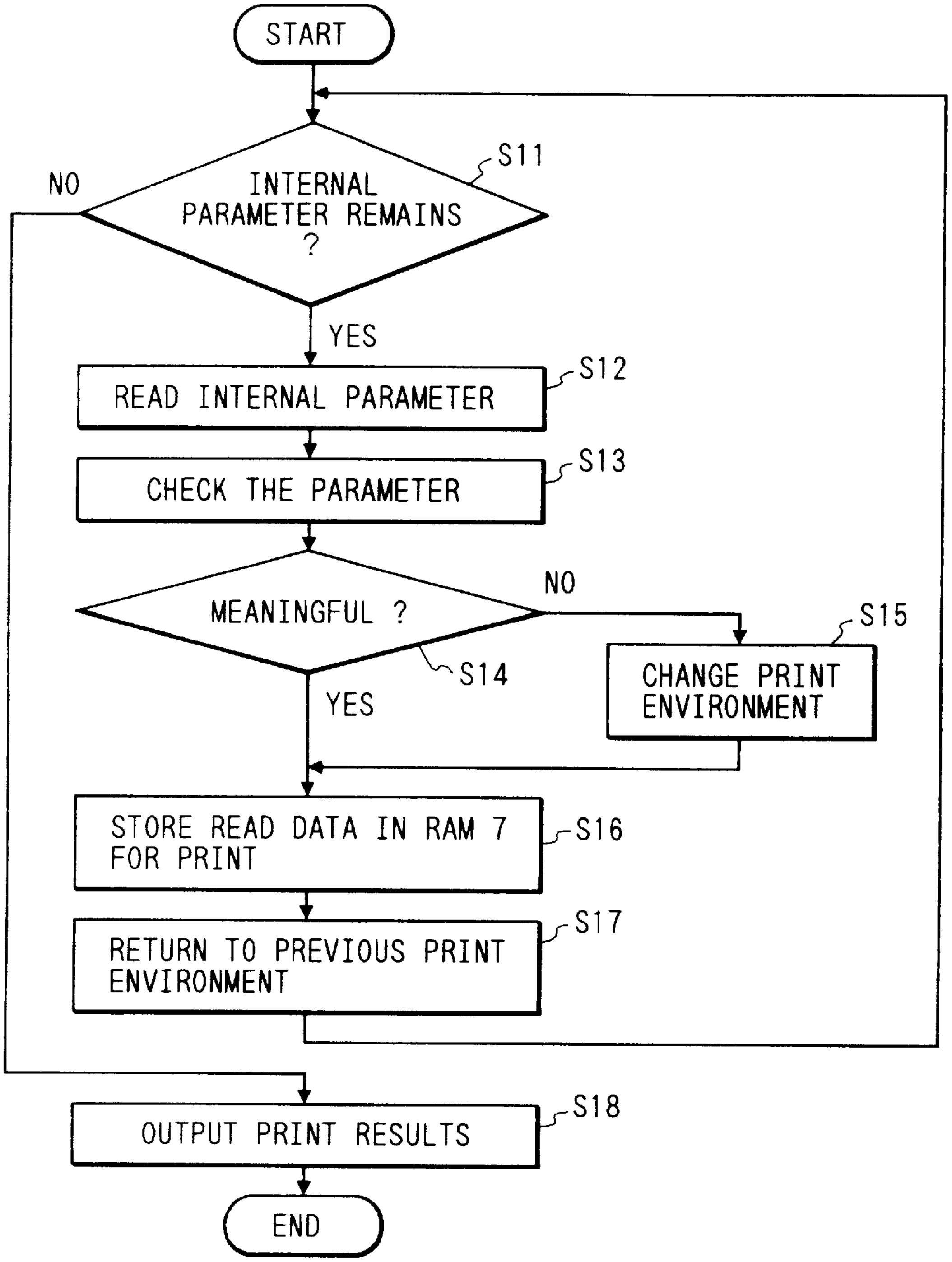
FIG. 3 is a flow chart showing a sequence employed by the printer of the first embodiment to print meaningful and meaningless internal parameters while clarifying the difference therebetween.

FIG. 3 is a flow chart showing a sequence employed by the printer of the first embodiment to print meaningful and meaningless parameters while clarifying the difference therebetween. This flow chart shows the detailed processing in step S7 of the flow chart shown in FIG. 2. In step S11, the CPU 2 determines whether any of the internal parameters to be printed remains. While YES is obtained in step S11, the following processing (steps S12 to S17) is repeatedly executed.

In step S12, an internal parameter to be printed is read out. In step S13, it is checked whether the internal parameter is meaningful in the current internal condition of the printer, i.e., whether the internal parameter is a meaningful or meaningless parameter. Correlation information for each parameter, i.e., information serving as a reference for determination, is stored in the ROM 6. If it is determined in step S14 that the internal parameter is a meaningless parameter, the flow advances to step S15 to change the print environment associated with the subsequent character print operation. The flow then advances to step S16 to read out the set condition of the internal parameter and store the read data in the RAM 7 so as to execute a print operation. In step S17, the print environment is restored to the initial environment for the next internal condition determination processing. If it is determined in step S13 that the internal parameter is a meaningful parameter, the flow advances from step S14 to step S16 to print the internal condition without changing the print environment. The flow then returns from step S17 to step S11 to repeat the above-described processing.

If no internal parameter to be printed remains (all the internal parameters to be printed are printed), the flow advances to step S18 to output the print results, stored in the RAM 7 in step S16, from the print unit 1.

Figures 1, 12:
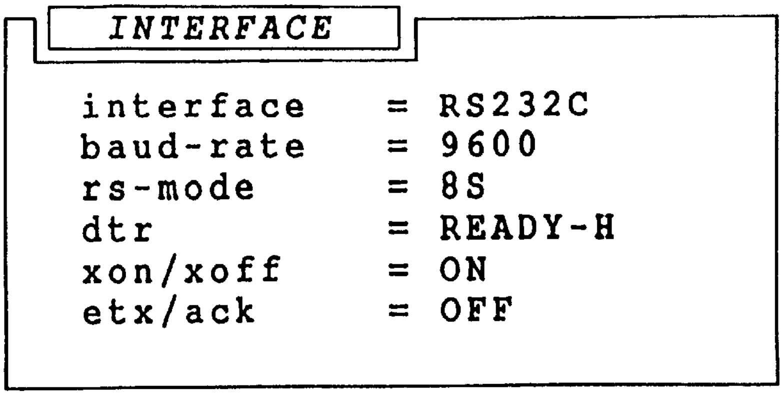
Figures 2, 12:
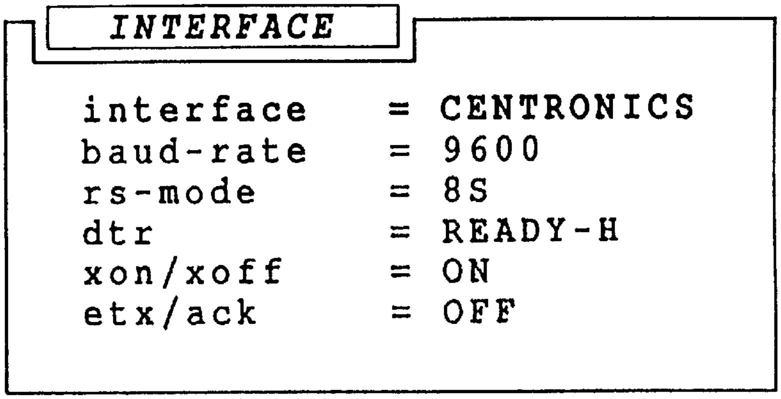

FIGS. 12-1 and 12-2 respectively show printed samples of internal parameters. In the two samples, the respective set conditions of the same interface are printed. If "serial (RS232C)" is selected as the interface, as shown in FIG. 12-1, since the remaining parameters are meaningful, these parameters are printed at a normal print density. If, however, "parallel (CENTRONICS)" is selected as the interface, as shown in FIG. 12-2, since the remaining parameters are meaningless, they ("baud-rate", "rs-mode", . . . ) are printed at a lower print density.

Figure 4:
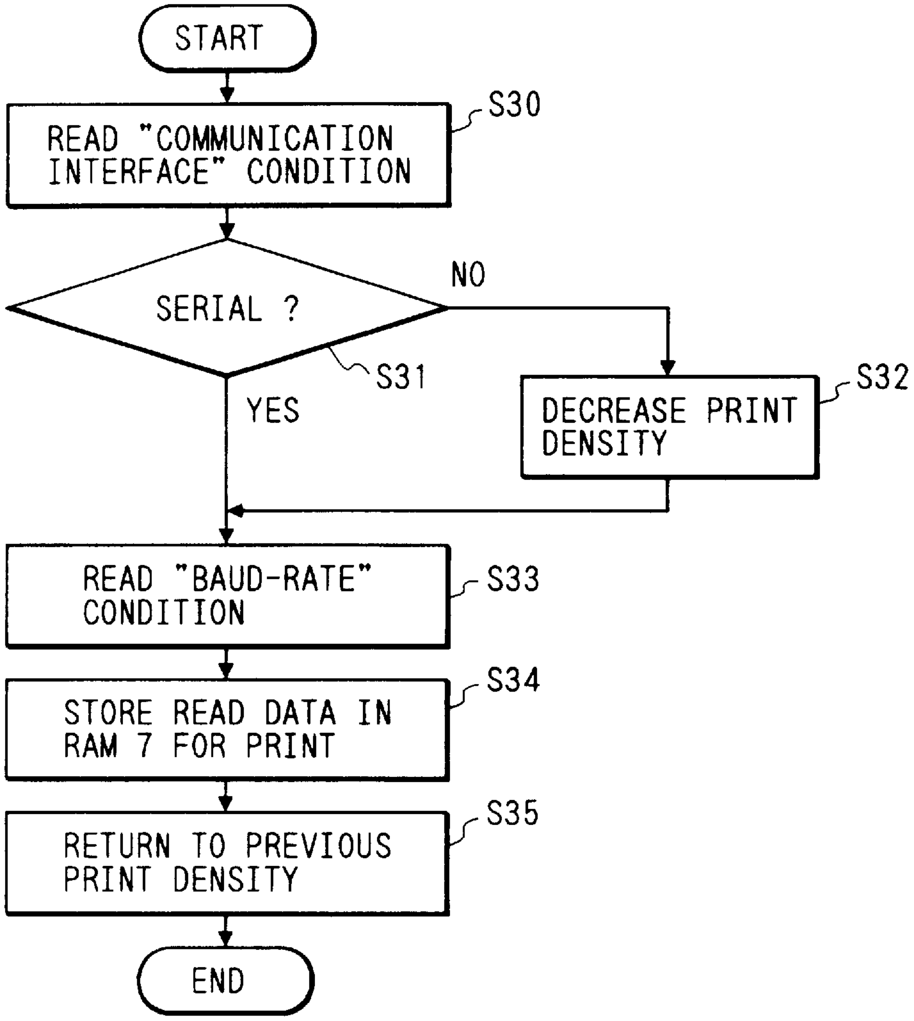
FIG. 4 is a flow chart showing a sequence from step S13 to step S17 in the flow chart in FIG. 3 in more detail.

FIG. 4 is a flow chart showing the sequence from step S13 to step S17 of the flow chart in FIG. 3 in more detail. Assume that the printer has two internal parameters, i.e., "communication interface" and "baud-rate", and that "communication interface" can take two set conditions, i.e., "serial" and "parallel". In addition, assume that "baud-rate" is meaningful only when "communication interface" takes the set condition of "serial". Furthermore, assume that in the printer of the embodiment, meaningless internal parameters in the current internal condition are printed at a low print density.

Referring to the flow chart in FIG. 4, when the printer is to print the condition of "communicating interface" as an internal parameter, the condition of "communicating interface" is read out first in step S30. If the current set condition of "communicating interface" is not "serial", since the set condition of "baud-rate" is meaningless in the printer, the flow advances from step S31 to step S32 to decrease the print density in the subsequent print operation. Thereafter, the set condition of "baud-rate" is read out in step S33, and is stored in the RAM 7 to be printed in step S34. In step S35, the print density is restored to the previous density for a print operation of the next parameter.

As described above, according to the first embodiment, when the internal condition of the printer is to be printed, each meaningless parameter, which is dependent on the set condition of another parameter and has no influence on the operation state in the current internal condition regardless of a change in the set condition, is printed upon changing the print environment. With this operation, meaningful and meaningless parameters in the current internal condition can be printed with the difference therebetween being clarified. Therefore, when the internal condition of the printer is to be changed, the user can easily judge, from the output print results of the internal condition, which parameters he/she should operate.

In the first embodiment, one internal parameter is presented as a parameter, on which a given internal parameter is dependent, to determine whether it is meaningful. However, an internal parameter which is dependent on a plurality of other internal parameters can also be processed by a control sequence similar to that of the embodiment described above.

Second Embodiment

The arrangement of a printer of the second embodiment is the same as that of the first embodiment described with reference to the block diagram in FIG. 1, and hence a description thereof will be omitted.

According to the second embodiment, in a printer 10 having the same arrangement as that shown in FIG. 1, the programs stored in a ROM 6 and indicated by the flow charts (FIGS. 5 to 7) to be described later are executed to obtain information indicating a specific method of changing the set content of each internal parameter in printing the internal condition of the printer. The print environment is then changed in accordance with this changing method, and the internal condition is printed. With this operation, parameters whose set conditions are to be changed by different methods are printed with the difference therebetween being clarified.

In the second embodiment, the processing shown in the flow chart shown in FIG. 2 is also executed. Since the detailed description of this flow chart is the same as that of the first embodiment, a description thereof will be omitted. In this case, when an internal condition print instruction is input from an operation unit 3, the flow advances from step S6 to step S7 to execute the processing shown in the flow chart shown in FIG. 5.

Figure 5:
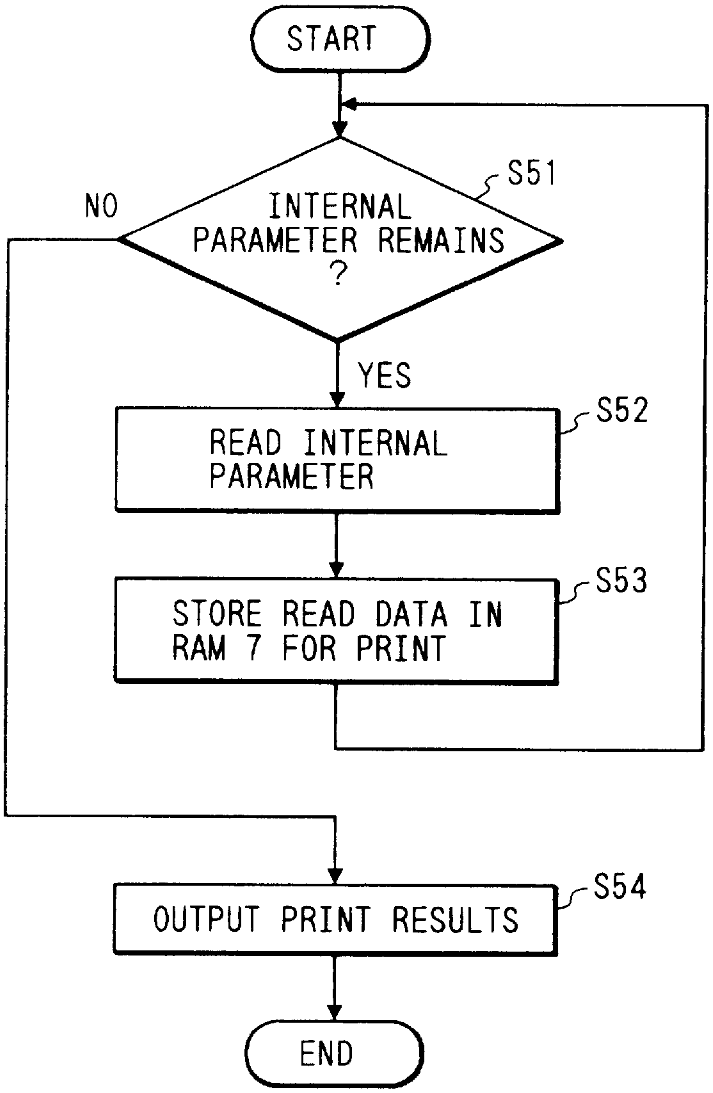
FIG. 5 is a flow chart showing a sequence employed by a printer of the second embodiment to print the internal condition of the printer while adding information about a method of setting each internal parameter.

FIG. 5 is a flow chart showing a sequence employed by the printer of the second embodiment to print the internal condition of the printer upon adding information associated with a method of setting each internal parameter. In step S51, a CPU 2 determines whether any of the internal parameters to be printed remains. While YES is obtained in step S51, the processing in steps S52 and S53 is repeatedly executed. In step S52, an internal parameter to be printed is read out. In step S53, the set content of the parameter is stored in a RAM 7 to be printed in step S53. When determination of all the internal parameters to be printed is completed, the flow advances to step S54 to output the print results from a print unit 1.

In step S53 described above, print programs corresponding to the respective internal parameters are prepared. This case will be described below with reference to FIGS. 6 and 7.

Assume that the printer 10 has two internal parameters, i.e., "baud-rate" and "sheet size", and that the set condition of "baud-rate" can be changed by only a button switch operation of an operation unit 3, while the set content of "sheet size" can be changed by both an operation of the operation unit 3 and print information from a host computer 20. In addition, assume that in the printer of the second embodiment, internal parameters whose set contents can be changed by only operating the operation unit 3 are printed upon increasing the print density.

Figure 6:
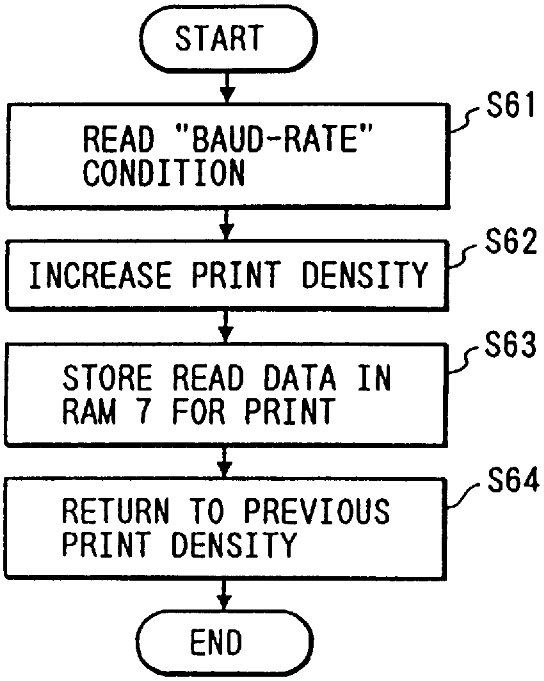
FIG. 6 is a flow chart showing a sequence employed by the printer of the second embodiment to print the set "baud-rate" condition.

FIG. 6 is a flow chart showing a sequence for printing the set condition of "baud-rate". The processing in this flow chart is to be executed in step S53 in the flow chart shown in FIG. 5 when the internal parameter read out in step S52 is "baud-rate". In step S61, the set "baud-rate" condition is read out. Since "baud-rate" is an internal parameter whose set condition can be changed by only an operation of the operation unit 3, the print density in the subsequent print operation is increased in step S62. Thereafter, in step S63, the "baud-rate" condition is stored in the RAM 7 to be printed. In step S64, the print density is restored to the previous density for a print operation of the next parameter.

Figure 7:
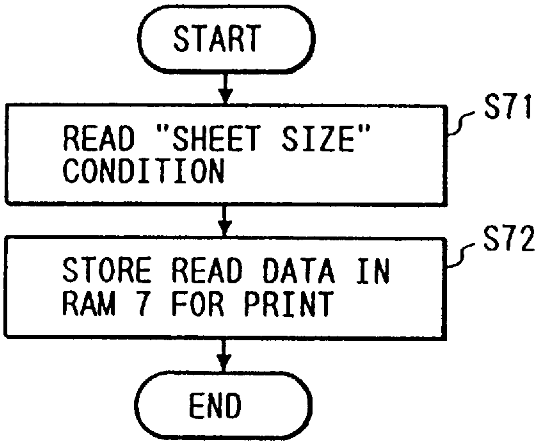
FIG. 7 is a flow chart showing a sequence employed by the printer of the second embodiment to print the set "sheet size" condition.

FIG. 7 is a flow chart showing a sequence for printing the set "sheet size" condition. The processing of this flow chart is to be executed in step S53 in the flow chart shown in FIG. 5 when the internal parameter read out in step S52 is "sheet size". In step S71, the set "sheet size" condition is read out first. Since the set content of "sheet size" can be changed by both an operation of the operation unit 3 and print information from the host computer 20, the data of "sheet size" to be printed is stored in the RAM 7 in step S72 while the current print density remains the same.

As described above, according to the second embodiment, when the internal condition of the printer is to be printed, printing can be performed upon changing the print environment in accordance with the methods of changing the set conditions of the respective internal parameters. With this operation, when the internal condition of the printer is to be changed, the user can easily know which operations he/she should perform to set desired internal parameters.

Third Embodiment

In the second embodiment described above, information indicating a specific method of changing the set content of a given internal parameter is stored as part of a program. That is, print programs are prepared in units of internal set programs. In contrast to this, in the third embodiment, information indicating a method of changing the set content of each internal parameter is stored, as bit map data, in a ROM 6 or a RAM 7. When the set contents of the respective internal parameters are to be printed, printing is performed upon clarifying the difference between the methods by referring to the corresponding bit data.

Since the arrangement of the printer of the third embodiment is the same as that of the second embodiment, a description thereof will be omitted.

Figure 8:
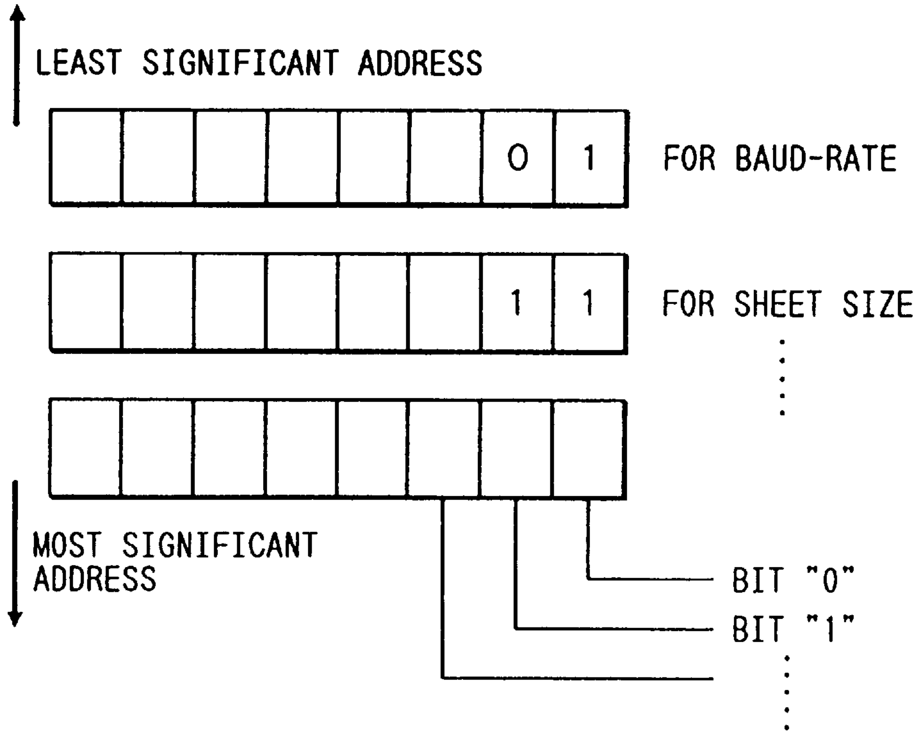
FIG. 8 is a view showing an example of bit map data associated with an operation of changing set contents.

FIG. 8 shows an example of bit map data associated with changing of the set contents stored in the ROM 6 (or the RAM 7). As shown in FIG. 8, 8-bit data areas are prepared in units of internal parameters. In each data area, bit "0" indicates with its value "1/0" whether setting can be performed by an operation unit 3, whereas bit "1" indicates with its value "1/0" whether setting can be performed by print information from a host computer.

Figure 9:
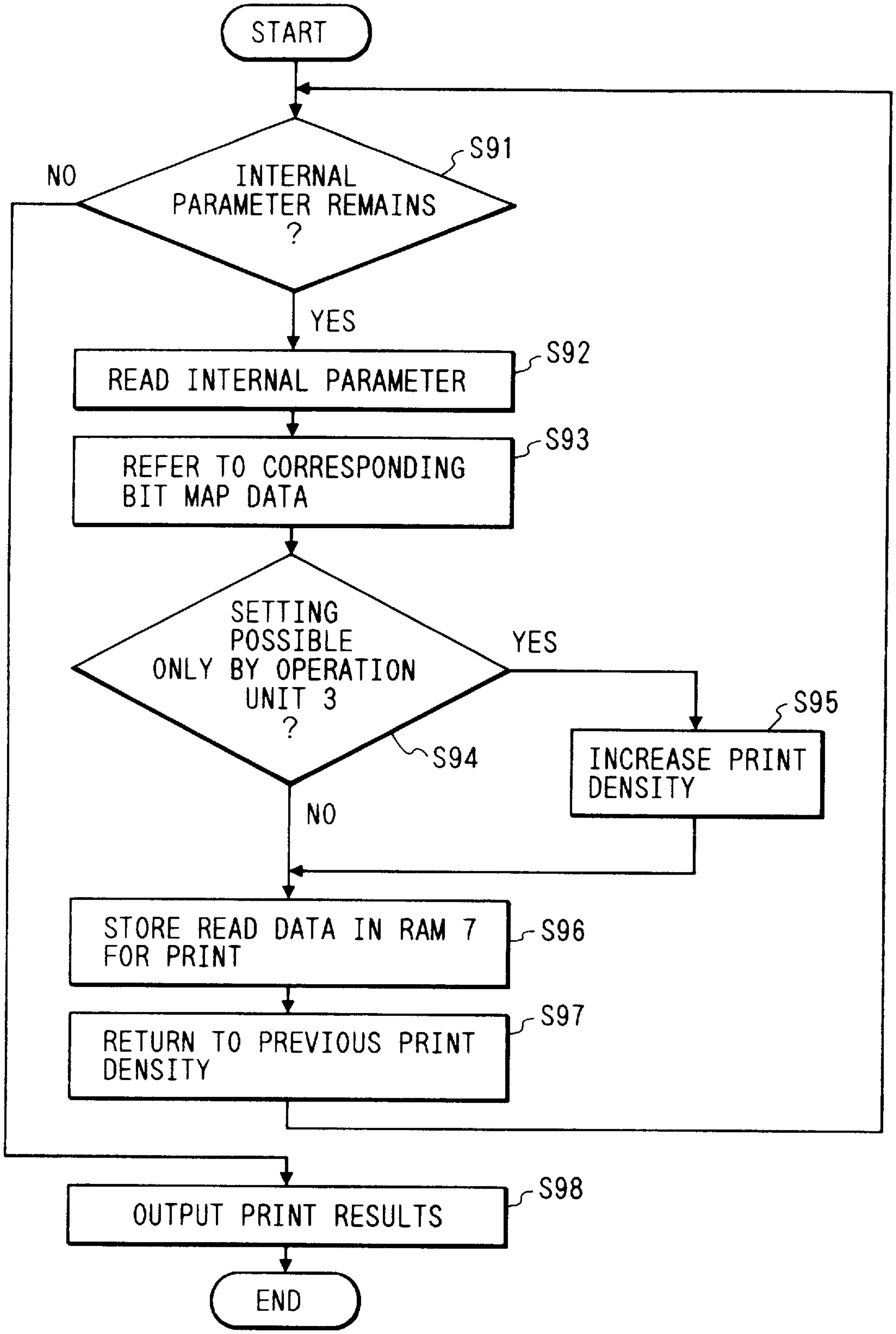
FIG. 9 is a flow chart showing a sequence employed by a printer of the third embodiment to print the internal condition of the printer while adding information about a method of setting each internal parameter by using bit map data.

FIG. 9 is a flow chart showing a sequence employed the printer of the third embodiment to print the internal condition of the printer upon adding information associated with a method of setting each internal parameter by using the bit map data shown in FIG. 8. Note that the program for executing the processing in this flow chart is stored in the ROM 6. When an internal condition print instruction is input from the operation unit 3, the flow advances from step S6 to step S7 in FIG. 2. In step S7, the processing in the flow chart shown in FIG. 9 is executed.

In step S91, a CPU 2 checks whether any of the internal parameters to be printed remains. While YES is obtained in step S91, the processing in step S92 to step S97 is executed. In step S92, an internal parameter to be printed is read out. In step S93, bit map data corresponding to the read internal parameter is referred to. In step S94, it is checked, on the basis of the result obtained by referring to the bit map data, whether set condition of the internal parameter can be changed by only the operation unit 3.

If YES in step S94, the flow advances to step S95 to increase the print density. The flow then advances to step S96. If it is determined in step S94 that the sent condition can also be changed by print information from the host computer 20, the flow directly advances to step S96. In step S96, the set condition of the internal parameter is stored in the RAM 7 to be printed in step S96. In step S97, the print density is restored to the previous density for a print operation of the next internal parameter. The flow then returns to step S91 to repeat the above-described processing.

If NO in step S91, the flow advances to step S98 to output the print results.

When the internal condition of the printer is printed in the above-described manner similar to that in the second embodiment, printing can be performed upon changing the print environment in accordance with an operating method of changing the set content of each internal parameter, thereby obtaining the same effects as those in the second embodiment.

Fourth Embodiment

Since the arrangement of a printer of the fourth embodiment is the same as that of the first embodiment shown in the block diagram in FIG. 1, a description thereof will be omitted.

According to the fourth embodiment, in a printer 10 having the same arrangement as that shown in FIG. 1, the program stored in a ROM 6 and indicated by the flow chart to be described later is executed. With this execution, in printing the internal condition of the printer, when a print space is not large enough to print all the code strings representing the set contents without any omission, printing can be performed while information clarifying that some of the set contents is omitted is added to the last portion of the data which can be printed.

Figure 13:
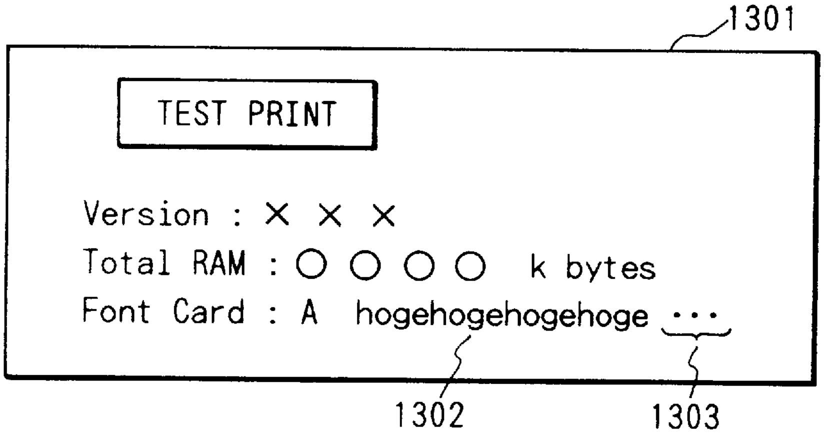
FIG. 13 is a view showing a printed sample of an internal parameter in the fourth embodiment.

FIG. 13 shows a printed sample in this embodiment. In this sample, since a name 1302 of a font card is too long to be printed within a frame 1301, dots " . . . " 1303, for example, are added to inform the omission of data.

In the fourth embodiment, the processing in the flow chart shown in FIG. 2 is also executed first. Since this processing is the same as that in the first embodiment, a detailed description thereof will be omitted. In this case, when an internal condition print instruction is input from an operation unit 3, the flow advances from step S6 to step S7 to execute the processing in the flow chart shown in FIG. 10.

Figure 10:
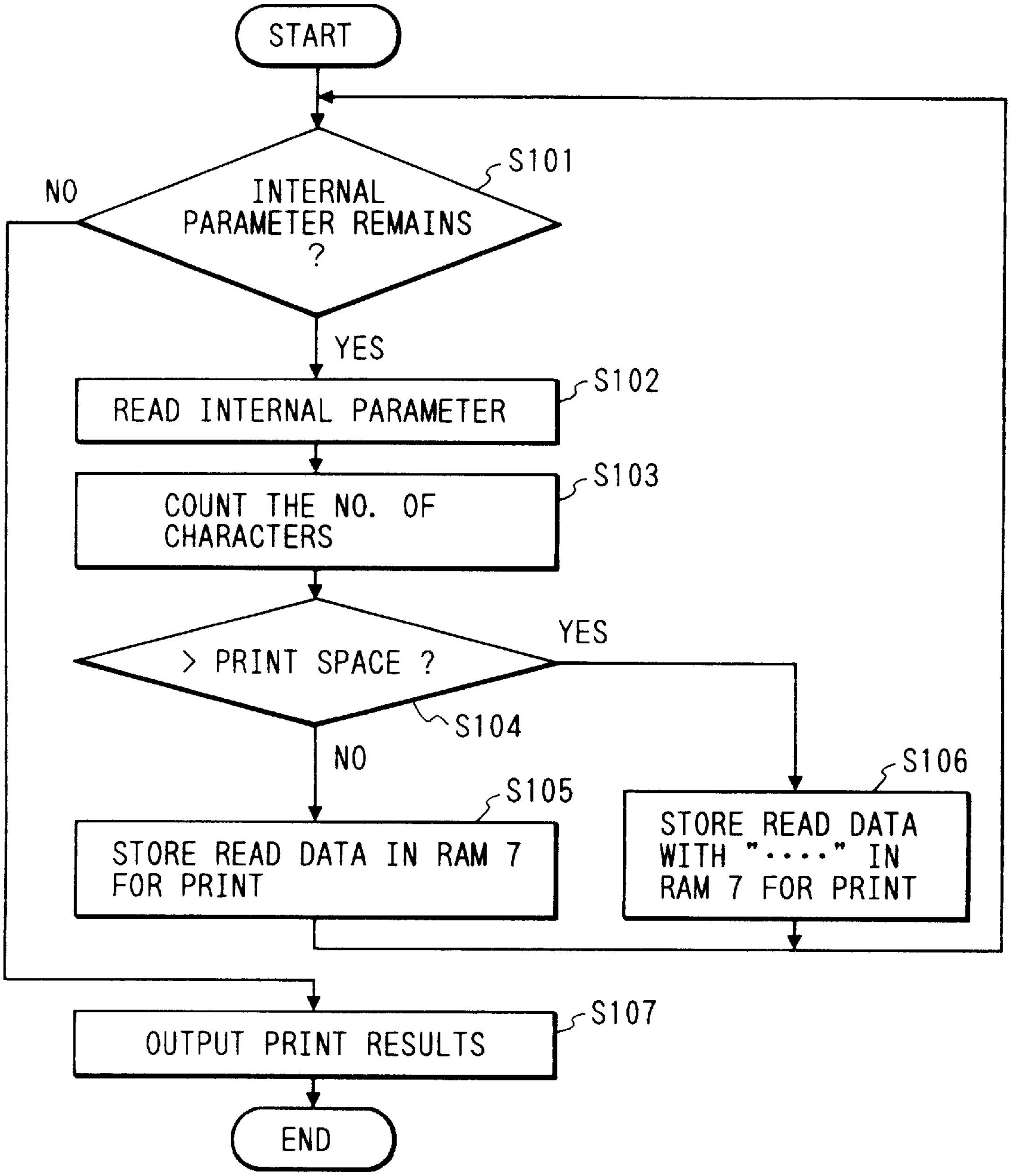
FIG. 10 is a flow chart showing a sequence employed by a printer of the fourth embodiment to perform print processing of internal parameters.

FIG. 10 is a flow chart showing a sequence employed by the printer of the fourth embodiment to print internal parameters. In step S101, a CPU 2 checks whether any of the internal parameters to be printed remains. While YES is obtained in step S101, the processing from step S102 to step S106 is repeatedly executed.

In step S102, the set condition of an internal parameter to be printed is read out. In step S103, the number of characters of a code string corresponding to the set content is counted. In step S104, the CPU 2 compares the number of characters in a print space, which can be used to print the set condition, with the length of the code string corresponding to the set content. If the print space is larger, the flow advances to step S105. In step S105, since the entire code string representing the set condition can be printed, the data of the entire code string is stored in a RAM 7 to be printed. If it is determined in step S104 that the code string representing the set condition is longer than the print space, the flow advances to step S106. In step S106, since not the entire code string can be printed, the read data is stored in the RAM 7 to be printed such that a last portion of the data which can be printed is replaced with a code string representing that part of the set content is omitted.

If it is determined in step S101 that no internal parameter to be output remains, the flow advances to step S107 to output the print results.

Figure 11:
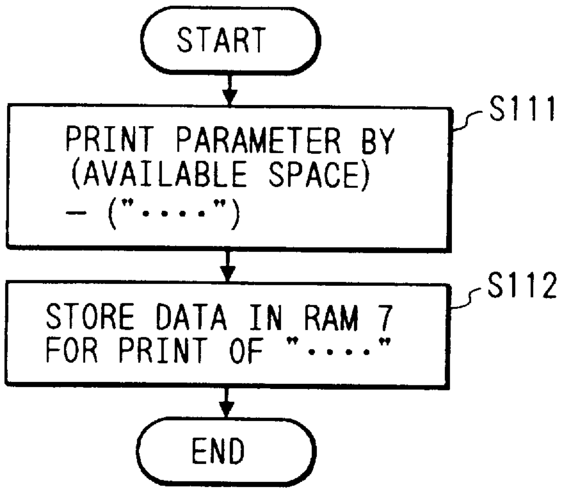
FIG. 11 is a flow chart showing the processing in step S106 in the flow chart in FIG. 6 in more detail.

FIG. 11 is a flow chart showing the processing in step S106 in the flow chart in FIG. 10 in more detail. In step S111, the code string representing the set condition is printed first by an amount corresponding to the number of characters obtained by subtracting {the number of characters of the code string representing the omission} from {the number of characters of the available space}. Subsequently, in step S112, the data of the code string representing the omission is stored in the RAM 7 to be printed.

As described above, according to the printer of the fourth embodiment, in printing the set condition of an internal parameter, when a corresponding print space is not large enough to allow printing of the entire code string representing the set content without any omission, printing of a portion, of the code string, which overflows the available space is omitted, and a code string representing the omission of a portion of the set content is printed at an end portion of the available space. That is, the printer can print the set content while clarifying the omission of a portion of the set content, thereby preventing disordered mixture of the set contents of internal parameters and other print information, i.e., disordered print results. In addition, since the user can easily judge that a portion of an obtained output is omitted, he/she does not misunderstand the internal condition of the printer.

In the fourth embodiment, whether there is a print space large enough to allow printing of a code string representing the set content of each internal parameter without any omission is checked by the method of comparing the number of characters of the available space with that of the code string representing the set content. However, the present invention is not limited to this. For example, such a check may be performed by comparing the accumulated print font width of characters, used to print a set condition, with a print space.

Furthermore, whether all or some of code strings representing the set contents of internal parameters can be printed without any omission may be checked in advance. Of these code strings, code strings which overflow corresponding print spaces may be partly replaced with code strings indicating that portions of the set contents are omitted, respectively, and the resultant code strings may be stored in a RAM.

In the respective embodiments (first to fourth embodiments) described above, an instruction to print the internal condition is supplied from the operation unit 3. However, the present invention is not limited to this. In decoding print information from the host computer 20, if the printer includes a means for supplying a control instruction to print the internal condition and decoding the print information, the internal condition can be printed and output by the print information from the host computer 20 as well as an operation of the operation unit 3.

In the respective embodiments (first to third embodiments) described above, the means for changing the print density is used as a means for clarifying the difference between meaningful and meaningless parameters of the current set parameters, or as a means for clarifying the difference between operating methods. However, the present invention is not limited to this. For example, the print positions of characters representing an internal parameter to be clarified may be changed, or the colors of characters may be changed if a printer capable of printing data in a plurality of colors. Alternatively, an underline may be drawn below an internal parameter to be clarified. Furthermore, in the fourth embodiment, the omission of a portion of an internal parameter printed is clarified by printing a code string representing the omission. However, the present invention is not limited to this, and various modifications can be made as in the first to third embodiments described above.

Figures 1, 14:
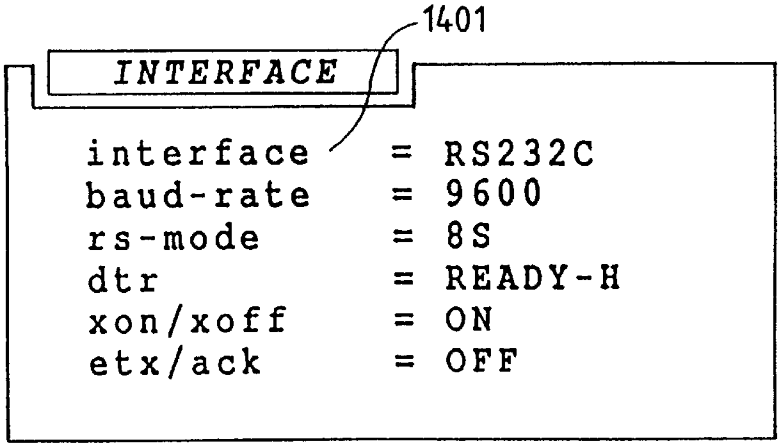
Figures 2, 14:
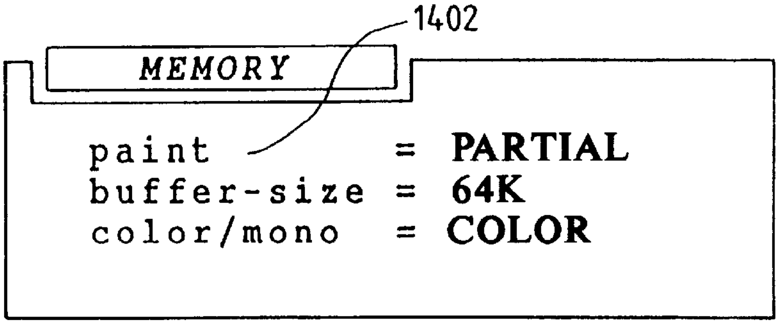

FIGS. 14-1 and 14-2 show samples printed with different character fonts. In these samples, the names of parameters of "INTERFACE" which can be set from only the panel are printed with boldface as indicated by reference numeral 1401 in FIG. 14-1, whereas the names of parameters of "MEMORY" which can be set by commands from the host computer as well as the panel are printed with the regular font as indicated by reference numeral 1402.

In addition, in each embodiment described above, as a means for outputting the internal condition, printing on a recording medium is employed. However, the present invention is not limited to this. For example, the present invention can be applied to display output performed by a liquid crystal display incorporated in a printer.

Furthermore, a printer having a combination of the functions of the respective embodiments described above may be provided. That is, meaningless internal parameters in the current internal condition of the printer, operating methods of setting the respective internal parameters, and the omission of part of the description of the internal condition can be clarified and printed.

The present invention may be applied to a system constituted by a plurality of devices or to an apparatus constituted by a single device. In addition, it is apparent that the present invention can be applied to a case wherein the above-described functions can be achieved by supplying programs to a system or an apparatus.

What is claimed is:

1. A printer comprising:

first storage means for storing internal parameters representing an internal condition of said printer;

display means for displaying the internal parameters stored in said first storage means;

discriminating means for discriminating, in a designated mode defining a current internal condition, a first type of one or more internal parameters that are required to be set in the designated mode so constituting in the mode meaningful internal parameters and a second type of one or more internal parameters that are not required to be set in the designated mode so constituting in the mode meaningless internal parameters;

second storage means for storing correlation information for each internal parameter, the correlation information serving as a reference for the discriminating performed by said discriminating means; and control means for controlling said display means to display the first and second types of the one or more internal parameters, with the first and second types being distinguishable from each other, based on a discrimination result obtained by said discriminating means.

2. A printer according to claim 1, wherein the first type and second type of internal parameters are distinguished by a difference in print density.

3. A printer according to claim 1, further comprising a thermal printer.

4. A printer according to claim 1, further comprising an ink jet printer.

5. A printer according to claim 1, wherein said control means controls said display means to switch attributes of the display by changing a type of font used to display each of the first and second types of internal parameters.

6. A printer according to claim 1, wherein said control means controls said display means to switch attributes of the display by changing a color of font used to display each of the first and second types of internal parameters.

7. A printer according to claim 1, wherein said display means displays item names of the internal parameters.

8. A printer according to claim 1, wherein said display means displays how the internal parameters are set.

9. An internal condition output method comprising the steps of:

storing internal parameters representing an internal condition of a printer;

displaying the internal parameters stored in said storing step;

discriminating, in a designated mode defining a current internal condition, a first type of one or more internal parameters that are required to be set in the designated mode so constituting in the mode meaningful internal parameters and a second type of one or more internal parameters that are not required to be set in the designated mode so constituting in the mode meaningless internal parameters;

storing correlation information for each internal parameter, the correlation information serving as a reference for said discriminating step; and controlling said display step to display the first and second types of the one or more internal parameters, with the first and second types being distinguishable from each other, based on a discrimination result obtained in said discriminating step.

10. A method according to claim 9, wherein the first type and second type of internal parameters are distinguished by a difference in print density.

11. A method according to claim 9, wherein said displaying step is performed using a thermal printer.

12. A method according to claim 9, wherein said displaying step is performed using an ink jet printer.

13. A method according to claim 9, wherein said control step controls said displaying step to switch attributes of the display by changing a type of font used to display each of the first and second types of internal parameters.

14. A method according to claim 9, wherein said control step controls said displaying step to switch attributes of the display by changing a color of font used to display each of the first and second types of internal parameters.

15. A method according to claim 9, wherein said displaying step displays item names of the internal parameters.

16. A method according to claim 9, wherein said displaying step displays how the internal parameters are set.

* * * * *

UNITED STATES PATENT AND TRADEMARK OFFICE
CERTIFICATE OF CORRECTION

PATENT NO. : 5,892,889
DATED : April 6, 1999
INVENTOR(S) : Takanori Nishijima

It is certified that error appears in the above-identified patent and that said Letters Patent is hereby corrected as shown below:

Title page,
Item [56], References Cited, "02034376" should read -- 2-034376 --.

Column 7,
Line 9, "employed" should read -- employed by --.

Signed and Sealed this

Thirty-first Day of December, 2002

JAMES E. ROGAN
*Director of the United States Patent and Trademark Office*